US 9,303,804 B2

(12) United States Patent
Ismert (10) Patent No.: US 9,303,804 B2
(45) Date of Patent: Apr. 5, 2016

(54) COMBINATION GLUE HUB AND MECHANICAL COUPLER FOR PIPE FITTINGS

(71) Applicant: Sioux Chief Mfg. Co., Inc., Peculiar, MO (US)

(72) Inventor: Dominic P. Ismert, Kansas City, MO (US)

(73) Assignee: SIOUX CHIEF MFG. CO., INC., Peculiar, MO (US)

(*) Notice: Subject to any disclaimer, the term of this patent is extended or adjusted under 35 U.S.C. 154(b) by 346 days.

(21) Appl. No.: 13/795,012

(22) Filed: Mar. 12, 2013

(65) Prior Publication Data

US 2014/0265303 A1 Sep. 18, 2014

(51) Int. Cl.
*F16L 37/16* (2006.01)
*F16L 37/12* (2006.01)
*F16L 37/113* (2006.01)

(52) U.S. Cl.
CPC .............. *F16L 37/123* (2013.01); *F16L 37/113* (2013.01)

(58) Field of Classification Search
CPC ........... F16L 21/03; F16L 13/02; F16L 21/02; F16L 19/06; F16L 21/035; F16L 21/04
USPC .......... 285/401, 402, 376, 377, 322, 323, 324
See application file for complete search history.

(56) References Cited

U.S. PATENT DOCUMENTS

| | | | |
|---|---|---|---|
| 263,863 A | 9/1882 | Converse | |
| 283,974 A | 8/1883 | Converse | |
| 342,305 A | 5/1886 | Nuttall | |
| 371,782 A | 10/1887 | Norton et al. | |
| 371,787 A | 10/1887 | Richards | |
| 1,907,661 A * | 5/1933 | Phillips | 285/322 |
| 2,158,757 A | 5/1939 | Kuestermeier | |
| 2,250,477 A | 7/1941 | Fleischman | |
| 2,255,673 A | 9/1941 | McDermott | |
| 2,288,506 A | 6/1942 | White | |
| 2,498,831 A | 2/1950 | Veitch | |
| 2,787,479 A | 4/1957 | Burns | |
| 2,816,472 A | 12/1957 | Boughton | |
| 3,188,122 A | 6/1965 | Smith | |
| 3,233,925 A | 2/1966 | Stevens | |
| 3,480,300 A * | 11/1969 | Teague et al. | 285/401 |
| 3,747,964 A | 7/1973 | Nilsen, Jr. | |
| 3,895,832 A * | 7/1975 | Ellis et al. | 285/322 |
| 4,067,534 A | 1/1978 | Frey | |

(Continued)

*Primary Examiner* — David E Bochna
(74) *Attorney, Agent, or Firm* — Erickson Kernel Derusseau & Kleypas, LLC (57) ABSTRACT

A fitting for plumbing systems, such as drain/waste/ventilation (DWV) systems that is chemically and mechanically joinable is described. A socket of the fitting has an interior surface configured for chemically joining with tubing. An exterior surface of the socket includes a plurality of projections extending radially outward therefrom. A collar that includes a sidewall with a plurality of bayonet-style channels configured to engage respective projections is provided. Interaction of the projections with the channels during rotation of the collar with respect to the fitting draws the collar toward the fitting and compresses an O-ring between the collar, socket, and tubing inserted therein to form a fluid-tight seal and/or mechanically couple the tubing in the socket. The collar may include longitudinally depending flanges that are depressed against the tubing by a compression ring to mechanically couple the tubing in the socket.

21 Claims, 8 Drawing Sheets

(56) References Cited

U.S. PATENT DOCUMENTS

| | | | | |
|---|---|---|---|---|
| 4,328,983 | A | 5/1982 | Gibson | |
| 4,783,099 | A | 11/1988 | Muser | |
| 4,820,285 | A * | 4/1989 | Leise et al. | 285/376 |
| 5,336,351 | A * | 8/1994 | Meyers | 285/423 |
| 5,378,027 | A * | 1/1995 | Gehring | 285/322 |
| 5,397,196 | A * | 3/1995 | Boiret et al. | 285/401 |
| 5,667,251 | A * | 9/1997 | Prest | 285/376 |
| 5,833,276 | A | 11/1998 | Thompson, Jr. | |
| 6,494,501 | B2 | 12/2002 | Gotoh | |
| 6,755,446 | B2 * | 6/2004 | Mintz et al. | 285/376 |
| 6,957,833 | B2 * | 10/2005 | Guest | 285/322 |
| 6,988,746 | B2 | 1/2006 | Olson | |
| 7,100,948 | B2 * | 9/2006 | Guest | 285/376 |
| 7,344,165 | B2 | 3/2008 | Le Quere et al. | |
| 7,504,582 | B1 * | 3/2009 | Chiu | 285/322 |
| 7,604,263 | B2 * | 10/2009 | Mori et al. | 285/376 |
| 7,963,567 | B2 * | 6/2011 | Gallardo et al. | 285/322 |
| 7,976,070 | B2 | 7/2011 | Kiely | |
| 8,020,899 | B2 | 9/2011 | Hanna et al. | |
| 8,403,370 | B2 * | 3/2013 | Choi | 285/322 |
| 8,632,104 | B2 * | 1/2014 | Horikawa et al. | 285/402 |
| 8,746,747 | B2 * | 6/2014 | McPherson | 285/296.1 |
| 8,857,398 | B2 * | 10/2014 | Schieszl | 285/402 |
| 2005/0104375 | A1 | 5/2005 | Thompson | |

\* cited by examiner

COMBINATION GLUE HUB AND MECHANICAL COUPLER FOR PIPE FITTINGS

BACKGROUND

Numerous methods and devices are available for coupling pipes or tubing with the various fittings used in plumbed systems, and in particular for drainage, waste, and ventilation (DWV) systems. These include the use of glues, adhesives, and solvents to glue or chemically weld components together. PVC, CPVC and ABS plastic plumbing tubing and fittings are typically coupled by solvent welding. It is known to use heat to melt and weld together plastic tubing and fittings formed from polyethylene or polypropylene Mechanical couplings that use compression fittings, toothed collets, interlocking ribs and recesses, electrical-resistance welding, and the like are also known.

Experienced installers typically utilize plumbing tubing and fittings adapted for solvent welding as the tubing and fittings are generally less expensive. In addition, when installed properly, the solvent weld systems may be less prone to leak. However, solvent weld systems are more difficult to install for inexperienced installers and installation conditions may make the use of mechanical couplings preferable.

The fittings employed for each of these joining methods are method specific, e.g. are designed for a specific joining method. As such, manufacturers, wholesalers, and retailers must stock separate fittings for each joining method. This requires additional storage space and inventory to be maintained, as installers must have the correct fitting for each particular joining method that they might use on the job site. This can be a difficult task when an installer is unaware of the particular conditions they might encounter during an installation. For example, the installer might plan to use only glue fittings for a given installation. The installer might then encounter an instance in which the use of glue fittings creates a safety risk, such as in a confined space where ventilation of the glue vapors is not sufficient to prevent inhalation by the installer or combustion of the vapors by contact with a flame or other ignition source. In such a situation, the installer must cease work until additional fittings that are configured for another joining method are obtained.

SUMMARY

A high-level overview of various aspects of the invention are provided here, to provide an overview of the disclosure, and to introduce a selection of concepts that are further described in the Detailed-Description section below. In brief, this disclosure describes, among other things, fittings for coupling with tubing in plumbing systems that are configured for both welding or gluing and mechanical joining.

The fittings comprise any type of fitting including, for example, Ts, Ys, elbows, unions, and the like. The fittings include a hub or socket with an interior sized and configured to form a weld, chemically or through the application of heat or vibration, with a tube of a selected exterior diameter inserted therein. The exterior of the socket includes a plurality of radially extending projections that, in combination with a provided collar and O-ring or other sealing member, are useable to mechanically join the fitting to a tube inserted into the socket and form a water tight seal therebetween.

In one embodiment, the mechanical connection is formed as a twist and lock connection requiring no more than approximately a half-turn or a quarter-turn and preferably no more than a turn of one-eighth the collar relative to the socket to form the mechanical connection. In such an embodiment, the collar may include a plurality of channels in a sidewall thereof, one for each of the projections. The O-ring is disposed around a tube inserted in the socket and between the fitting and the collar. The projections on an exterior of the socket are engaged by the channels and follow the channels as the collar is rotated with respect to the fitting. The channels are shaped such that passing the projections into and along the channels draws the collar toward the fitting and compresses the O-ring between the fitting, collar, and the exterior of the tube to form a mechanical compression or friction fit joint. The channels include one or more detents in which the projections can come to rest and thereby lock the collar in a locked position. One or more locking features might also be provided within the channel to provide additional resistance to rotation of the collar in a reverse direction.

In a second embodiment, a two-part coupling that includes a collar and a compression ring is provided. The collar includes a first end configured with channels and an O-ring disposed therein for receiving and mechanically coupling to the projections of the socket as discussed above. A second end of the collar includes a threaded portion, a plurality of longitudinally extending tabs, and a gasket disposed interior thereto. The compression ring includes a mating threaded section and a tapered cylindrical interior form. Accordingly, the collar and compression ring can be disposed on a section of tubing to be mechanically joined with the socket. The collar is coupled to the protrusions on the socket via engagement thereof with the channels. The compression ring is threaded onto the threaded portion of the collar to draw the compression ring toward the collar and thereby depress the tabs on the collar against the exterior sidewall of the tube to resist withdrawal of the tube from the coupling. The O-ring provides a fluid-tight seal between the socket and the tube and the gasket provides frictional and compressive forces that resist withdrawal of the tube from the coupling.

A hand tool may be provided to aid in rotating the collar and/or compression ring into the locked position. The hand tool can also include a feature that is useable to release the locking feature to enable removal of the collar for dismantling the joined tube and fitting.

DESCRIPTION OF THE DRAWINGS

Illustrative embodiments of the invention are described in detail below with reference to the attached drawing figures, and wherein.

DETAILED DESCRIPTION

The subject matter of select embodiments of the invention is described with specificity herein to meet statutory requirements. But the description itself is not intended to necessarily limit the scope of embodiments of the invention. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Figure 1:
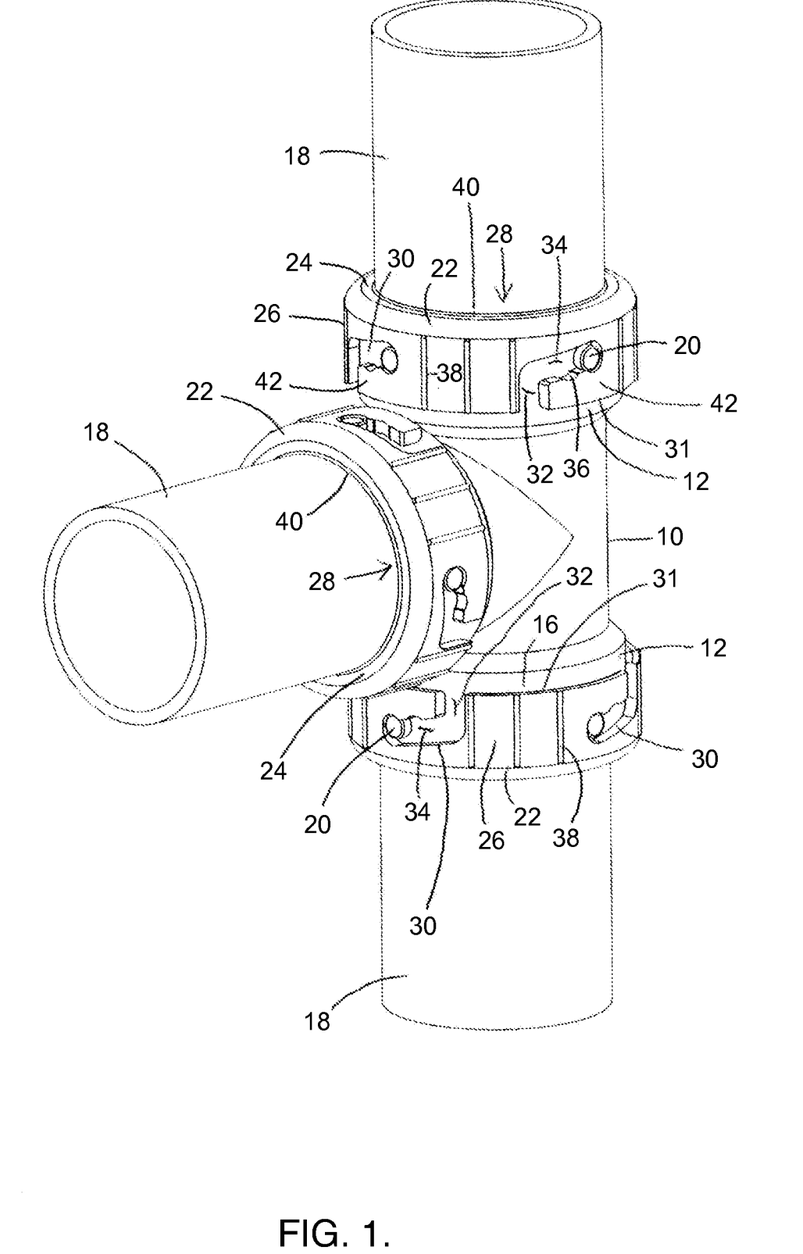
FIG. 1 is a perspective view of a T fitting that is mechanically coupled to tubing sections in accordance with an embodiment of the invention.
Figure 2:
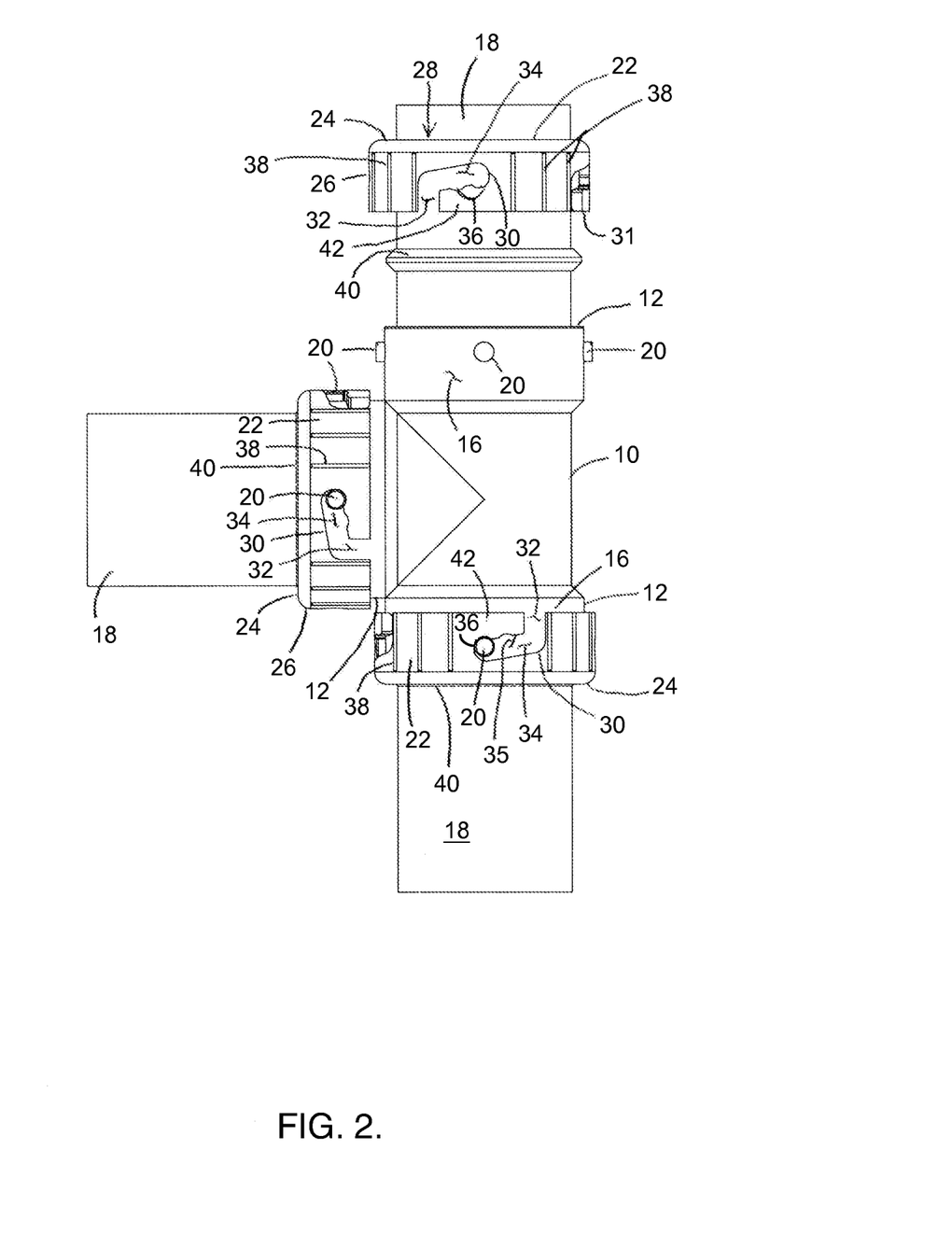
FIG. 2 is an elevational side view of a T fitting depicting components of a mechanical coupling in a disassembled state in accordance with an embodiment of the invention.
Figure 3:
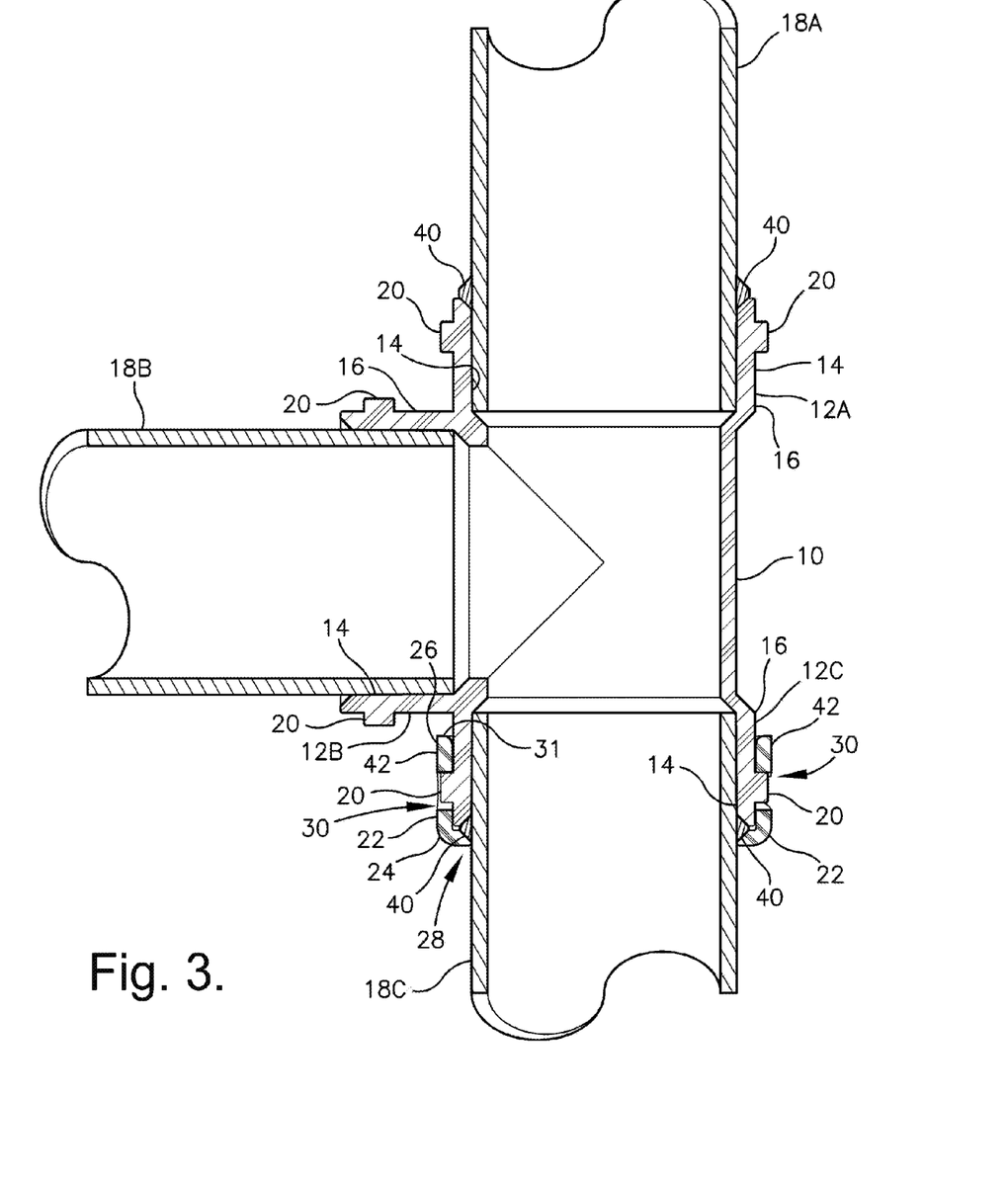
FIG. 3 is an elevational cross-sectional view of a T-fitting depicted in accordance with an embodiment of the invention and showing a collar removed from a mechanical connection of a first tube with an upper socket, a completed mechanical connection of a second tube with a lower socket, and a third tube coupled to a side socket via welding.
Figure 4:
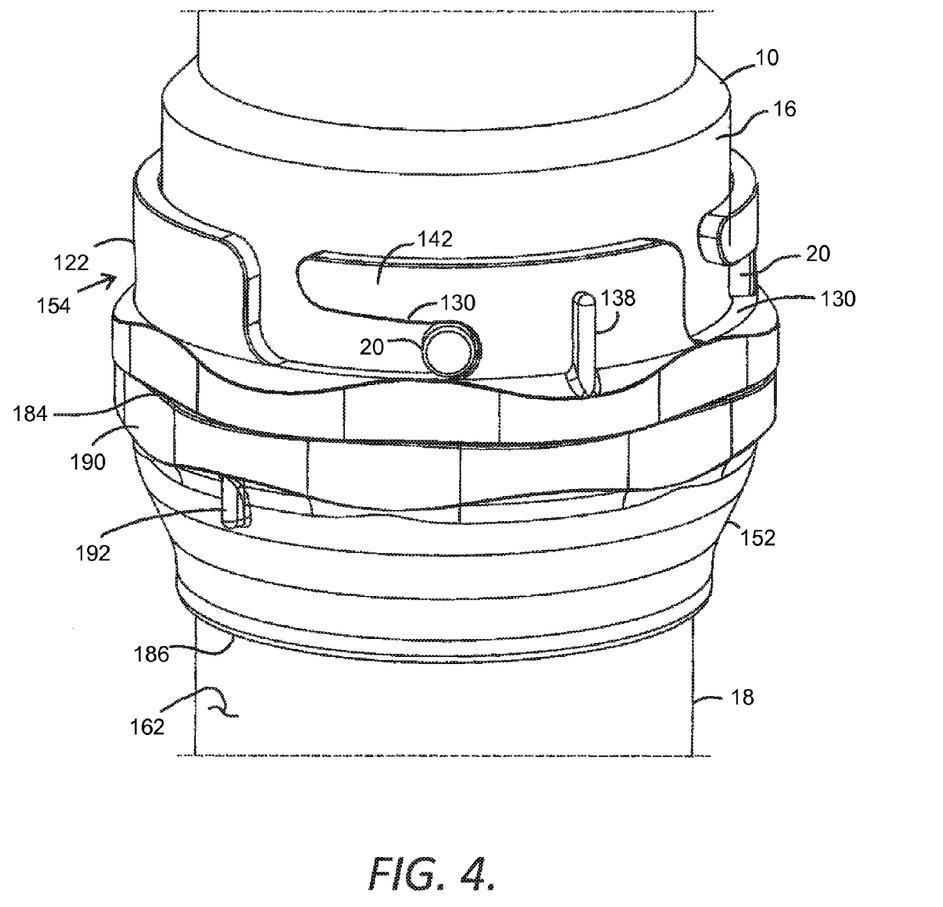
FIG. 4 is a perspective view of two-part coupler coupling a tube with a socket of a fitting in accordance with a second embodiment of the invention.
Figure 5:
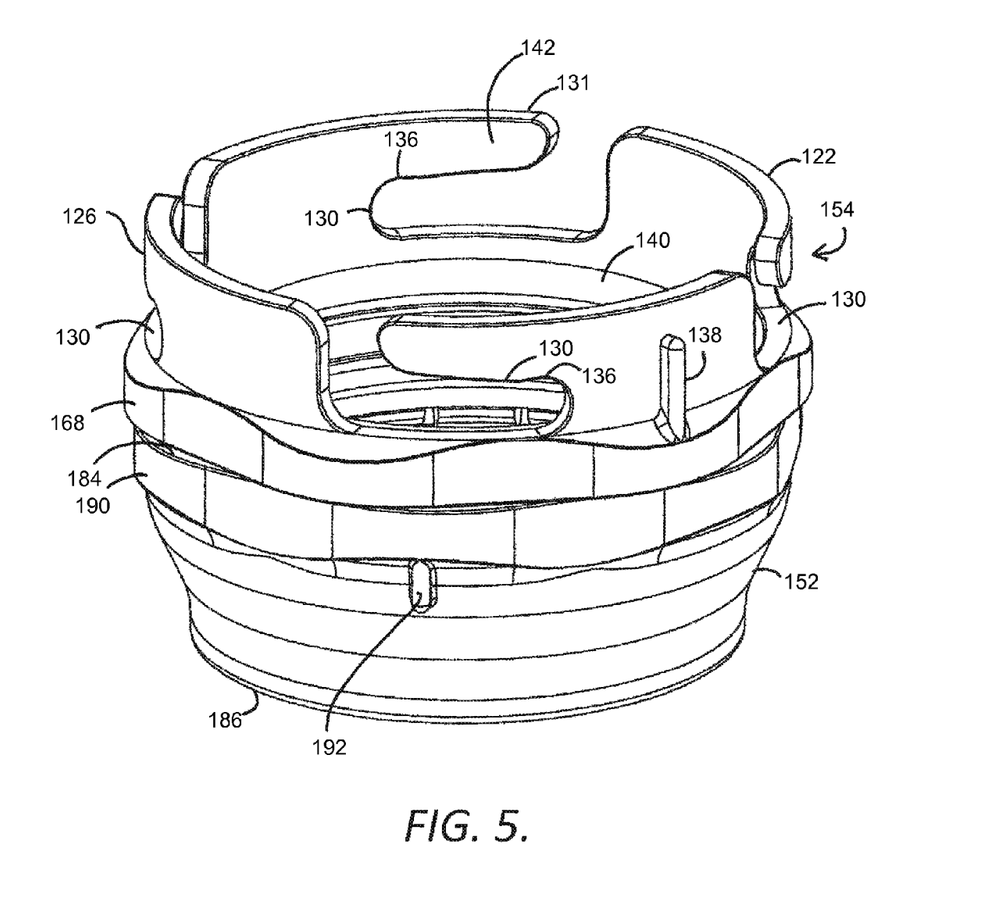
FIG. 5 is a perspective view of the two-part coupler of FIG. 4.

With reference to FIGS. 1-3, a fitting 10, such as the T-shaped fitting shown, configured for both welding and mechanical joining to tubing is described in accordance with an embodiment of the invention. Although the fitting 10 is show in FIGS. 1 and 2 as comprising a T-shaped fitting, it is to be understood that any style fitting including, for example, elbows, endcaps, Ys, unions, and the like are useable in embodiments of the invention. Embodiments of the invention are described herein with respect to PVC (polyvinyl chloride), CPVC (chlorinated polyvinyl chloride) or ABS (acrylonitrile butadiene styrene) tubing for DWV (drain/waste/ventilation) systems, but such is not intended to restrict embodiments to any particular material or application. PVC, CPVC and ABS are capable of being solvent welded and therefore are amenable for use with the present invention. However, it is to be understood that tube or pipe formed from other materials capable of being welded or otherwise bonded together such as by chemical or mechanical means may be acceptable for use in accordance with the present invention.

As a T-shaped fitting, the fitting 10 includes three hubs or sockets 12 (denoted 12A, 12B, and 12C for reference) in FIG. 3; other fitting styles may have a different numbers of sockets 12. As depicted in FIG. 3, each socket 12 has an interior face 14 and an exterior face 16. The interior face 14 is configured for joining with an end of a tube 18 that is inserted into the socket 12 by welding such as may be produced by the application of a solvent on the end of the tube 18 and on interior face 14 of socket 12, as depicted by the tube 18B installed in the socket 12B. The interior face 14 can be configured with any desired features to aid in welding the tube 18 within the socket 12. The features can be prescribed by building codes and other known standards. For example, as depicted in FIG. 3, the interior face 14 is tapered inwardly as is known in the art for DWV fittings.

The weld or bonding between the fitting 10 and the tube 18 is completed by any available method. Preferably, the joint is formed through a chemical or solvent welding process whereby a primer and solvent or cement are applied to the interior face 14 and exterior of the tube 18 prior to insertion of the tube 18 into the socket 12, but other chemical joining processes can be employed. Chemical or solvent welding of PVC fittings and tubing often employ a primer comprised of a combination of chemicals like tetrahydrofuran, methyl ethyl ketone, acetone, and cyclohexanone, and a solvent or cement comprised of similar ingredients along with a PVC resin among other ingredients. The solvent welding process works by melting or softening the interior surface 14 of the socket 12 and the exterior surface of the tube 18 which then bond together and re-harden. Other chemical joining processes might employ glues, adhesives, solvents, epoxies, or the like.

It is foreseen that other welding processes that employ heat induced by electrical resistance, sound (e.g. sonic welding), or other energies to melt or soften the components for joining the tube 18 and socket 12 can be employed. For example, an electro-welding process may be employed in place of the chemical welding process. Resistance wires or elements (not shown) are molded into the interior face 14 of the socket 12. The tube 18 is inserted therein and an electrical current is applied to the resistance elements to melt the interior face 14 and the tube 18 so that the molten material may bond and then harden together.

The exterior face 16 of the socket 12 is configured with means for mechanically joining tube 18 with the fitting 10. A plurality of projections 20, nubs, flanges, protuberances, or other raised features extend radially outward from the exterior face 16. The projections 20 in the embodiment shown are cylindrical in shape and are equally spaced about the circumference of the socket 12, but may comprise any desired shape and arrangement.

A coupler or collar 22 is provided that includes a circular endwall 24 with an annular sidewall 26 extending perpendicularly from a circumference thereof. The endwall 24 includes a central bore 28 sized to accept the tube 18 therethrough. The endwall 24 and sidewall 26 are dimensioned to accept the socket 12 therein.

The sidewall 26 includes a plurality of receivers or bayonet-style channels 30 therein and spaced around the circumference of the collar 22 to align with a respective one of the projections on the exterior face 16 of the socket 12. As depicted in FIGS. 1-3 the channels 30 extend through the width of the sidewall 26, but in an alternative embodiment might be contained within the interior of the sidewall 26, e.g. not visible from outside the collar 22. The channels 30 are open to a distal or inner edge 31 of the sidewall 26 and include a first portion 32 that extends along the sidewall 26 toward the endwall 24 a first distance. A second portion 34 extends at an angle to the first portion 32 about the circumference of the sidewall 26 a second distance. The angle of the second portion 34 is generally perpendicular to the first portion 32 but at least slightly toward the endwall 24. One or more detents, cutouts or recesses 36 are included along the second portion 34 to engage a projection 20 of the exterior face 16 inserted therein as described below. One or more locking features 35, such as a flexible tab may be provided in one or more of the channels 30 to restrict withdrawal of a respective projection 20 from the channel 30.

One or more gripping features 38 are shown as formed on an exterior surface of the sidewall 26 to aid in gripping the collar 22 by hand and/or with a hand tool, such as a spanner wrench. The gripping features 38 may comprise ribs, recesses, flanges, tabs, or the like.

An O-ring 40 or gasket is provided to aid in forming and sealing the mechanical joint. The O-ring 40 is sized to fit snugly around the tube 18 and to be at least partially accepted into the socket 12. The O-ring 40 can comprise any cross-sectional shape and materials useable to form the mechanical joint as described herein. As depicted in FIGS. 2-3, the O-ring has a generally triangular cross-sectional shape, but might be circular, ovular, trapezoidal, or polygonal in cross-section, among other shapes.

A hand tool (not shown) similar to a spanner wrench may be provided. The hand tool is configured to aid in rotating the collar 22 with respect to the fitting 10. The hand tool may include flanges or other features configured to engage the gripping features 38 of the collar 22. The hand tool might also include one or more features configured to disengage the locking features 35 included in the channels 30 to allow the collar 22 to be removed from coupling with the fitting 10 as described below.

With continued reference to FIGS. 1-3, operation of the fitting 10 is described in accordance with an embodiment of the invention. Initially, an appropriate fitting-style is selected for a particular application by methods known in the art. A joining method is also selected. In embodiments of the invention, the selection of joining method does not affect the selection of a particular fitting 10 to be used. Whether the installer elects to weld the fitting to the pipe or join them mechanically the same fitting 10 can be employed. As such, an installer need not carry multiple sets of fittings, each of which being configured for a different joining method. And wholesalers and retailers need not stock multiple sets of fittings configured for each of the different joining methods used by their customers, e.g. a wholesaler can stock a single set of fittings 10 that are useable for weldable and mechanical joining methods rather than stocking one set of fittings configured for solvent welding and a separate set for mechanical joining. The fittings 10 can be supplied with the collars 22 and O-rings 40 included or the collars 22 and O-rings 40 can be supplied separately as needed by installers.

As depicted in FIG. 3, the tube 18B is installed in the socket 12B of the fitting 10 by welding, such as solvent welding methods following known procedures in the art. The tubes 18 and sockets 12 are denoted A, B, or C for reference purposes only—all of the tubes 18A-C or sockets 12A-C are configured for both welding and mechanical coupling. For PVC fittings 10 and tubing 18B, a primer is typically applied to the exterior of the tube 18B and to the interior face 14 of the socket 12B. A solvent or cement is then applied to one or both of the surfaces and the tube 18B inserted into the socket 12B. The primer and solvent cause the tube 18B and the interior face 14 of the fitting 10 to at least partially melt together to form a continuous joint around the circumference of the socket 12B. When the tube 18B and socket 12B are joined by welding, the projections 20 on the exterior face 16 of the socket 12B are not utilized and do not affect the performance or operation of the fitting 10.

To mechanically join the tube 18A, C and the fitting 10, the collar 22 is first installed on the tube 18A, C with the distal end of the sidewall 26 facing the fitting 10. The O-ring 40 is then installed on the tube 18A, C. One or more lubricants, sealants, or other materials can be applied to the interior face 14 of the socket 12A, C, the exterior of the tube 18A, C, the O-ring 40, and/or the collar 22 as desired. The end of the tube 18A, C is inserted into the socket 12A, C and the O-ring 40 and collar 22 are moved into contact with the fitting 10. The tube 18A and the socket 12A are depicted in FIG. 3 without the collar 22 installed to aid the reader—the collar 22 should be installed to complete the mechanical coupling of the tube 18A with the fitting 10.

The channels 30 are aligned with the projections 20 and the collar 22 is pressed toward the fitting 10 to move the first portion 32 of the channels 30 over or past aligned projections 20. The collar 22 is then rotated to advance the second portion 34 of the channels 30 over and across the projections 20.

Continued rotation of the collar 22 draws the collar 22 toward the fitting 10 due to the slight angle of the channel 30 toward the endwall 24 of the collar 22. Rotation of the collar 22 also moves the detents 36 in the channel 30 into alignment with the projections 30. Reception of the projections 20 within the detents 36 aids to resist rotation of the collar 22 in a reverse direction and thereby resists removal of the collar 22 from the fitting 10. The projections 20 might also be engaged by a locking feature 35 such as a flexible tab shown in FIG. 2 that allows passage of the projections 20 through the channel 30 in a first direction but restricts movement in an opposite direction. Reception of the projections 20 within the detents 36 and/or engagement by the locking feature 35 can provide an audible indication, such as a click, that indicates to an installer that the proper rotation has been achieved.

The O-ring 40 is trapped between the endwall 24 of the collar 22, the distal end and/or the interior face 14 of the socket 12, and the exterior of the tube 18. The O-ring 40 is thus compressed against the exterior of the tube 18 by movement of the collar 22 toward the fitting 10. The tube 18 is retained in the socket 12 by friction between the O-ring 40 and the exterior of the tube 18, as depicted by the tube 18C and the socket 12C in FIG. 3. The O-ring 40 also forms a seal between the tube 18 and the socket 12. Any lubricants or sealants applied to the socket 12, O-ring 40, and/or tube 18 may also aid in forming and retaining the seal between the fitting 10 and tube 18.

Compression of the O-ring 40 also provides a force on the collar 22 directed generally axially along the tube 18 and away from the fitting 10. This force aids to retain the projections 20 in the detents 36 of the collar 22. Additionally, portions 42 of the collar 22 that extend between the channels 22 and the distal edge of the sidewall 26 might at least partially flex to aid in engagement of the projections 20 with the detents 36.

Rotation of the collar 22 can be completed by hand and/or through the use of the hand tool described above. Multiple detents 36 might be provided in the channel 30 to provide increasing levels of compressive force on the O-ring 40 and resistance to reverse rotation of the collar 22. In an embodiment, the collar 22 is rotated by hand to engage a first detent 36; the hand tool is then used to rotate the collar 22 to engage a subsequent detent 36 and/or locking feature 35. The hand tool might be employed to rotate the collar 22 when doing so requires too much force for rotation by hand.

In one embodiment, the channels 30 are configured to provide sufficient compression of the O-ring 40 while minimizing the amount of rotation required of the collar 22. Rotation of the collar 22 is preferably less than half of a rotation, e.g. less than 180 degrees, or about ¼ rotation, or more preferably about ⅛ rotation. The degree of rotation of the collar 22 in the embodiment shown in FIGS. 1 and 2 is limited by the length of channels 30 formed in the sidewall 26 of collar 22. A channel 30 extending around approximately one eighth of the circumference of the sidewall 26 limits the rotation of the collar 22 relative to the socket 12 to no more than approximately one eighth of a turn. Similarly a channel 30 extending around approximately one fourth of the circumference of the sidewall 26 limits the rotation of the collar 22 relative to the socket 12 to no more than approximately one quarter of a turn and a channel 30 extending around approximately one half of the circumference of the sidewall 26 limits the rotation of the collar 22 relative to the socket 12 to no more than approximately one half of a turn. Minimizing the rotation aids in installation in confined spaces where available movement of the hand tool to rotate the collar 22 is limited. This also avoids moving the fitting 10 and any attached components out of a desired alignment during installation.

After joining the tube 18 to the socket 12, additional tubes 18 can be joined to the fitting 10 using any remaining sockets 12. The additional joints can be formed using the same welding or mechanical joining methods or different methods, e.g. a first joint might use solvent welding while a second joint uses mechanical joining. If desired, both a single socket 12 and tube 18 may be joined together by both welding and a mechanical coupling.

With reference now to FIGS. 4-8, a two-part coupler 100 is described in accordance with a second embodiment of the invention. The two-part coupler 100 shares some features with the collar 22 described above; such features are provided with corresponding reference numerals but with a leading "1" digit. The two-part coupler 100 includes a collar 122, an O-ring 140, a gasket 150, and a compression ring 152.

The collar 122 comprises a hub-connection portion or collar socket 154 at a first end and a tube-connection portion or collar base 156 at a second opposite end. The collar socket 154 includes a substantially cylindrical sidewall 126 with a plurality of L-shaped channels or bayonet type slots 130 extending from the endwall 124 into and along the circumference of the sidewall 126. The channels 130 are configured to receive the projections 20 on the exterior face of the fitting socket 12 as described previously above with respect to the collar 22.

An inner diameter defined by the tube-connection portion or collar base 156 is narrower than the inner diameter defined by the collar socket 154 as the collar base 156 is sized to form a close fit over the tube 18 and the collar socket 154 is sized to form a close fit over the fitting hub or socket 12. The collar base 156 extends coaxially from the sidewall 126 and terminates in a plurality of longitudinally extending fingers or flanges 158 that are spaced apart about the circumference of the collar base 156. The flanges 158 are at least partially flexible or displaceable toward a central axis of the collar 122. An exterior face 160 of the flanges 158 may taper inwardly toward the central axis of the collar 122 and toward their terminating ends. An interior face 162 of the flanges 158 may include a plurality of transverse ribs 164, serrations, teeth, or other profile features configured to engage or grip a sidewall 164 of the tube 18 as described more fully below. The exterior of the collar base 156 also includes a threaded section 166 disposed proximate the bases of the flanges 158. As shown, the threaded section 166 includes a thread extending about the exterior of the tube-connection portion or collar base 156 but might alternatively comprise ribs, tabs, projections, or the like configured for forming a mechanical coupling with the compression ring 152.

One or more gripping sections 168 or gripping features 138 can be provided on the exterior of the collar 122. The gripping sections 168 and features 138 provide surfaces that are useable by a user or installer of the collar 122 to grasp the collar 122 by hand or using a tool as described previously above.

The interior of the collar base 156 is separated from the interior of the collar socket 154 by a transverse annular face or shoulder 170 projecting radially inwardly from the sidewall 126 with a trough or groove 172 extending longitudinally therein and away from the endwall 124 of the collar 122. The groove 172 is configured to receive a portion of the O-ring 140 supported against the shoulder 170.

Figure 7:
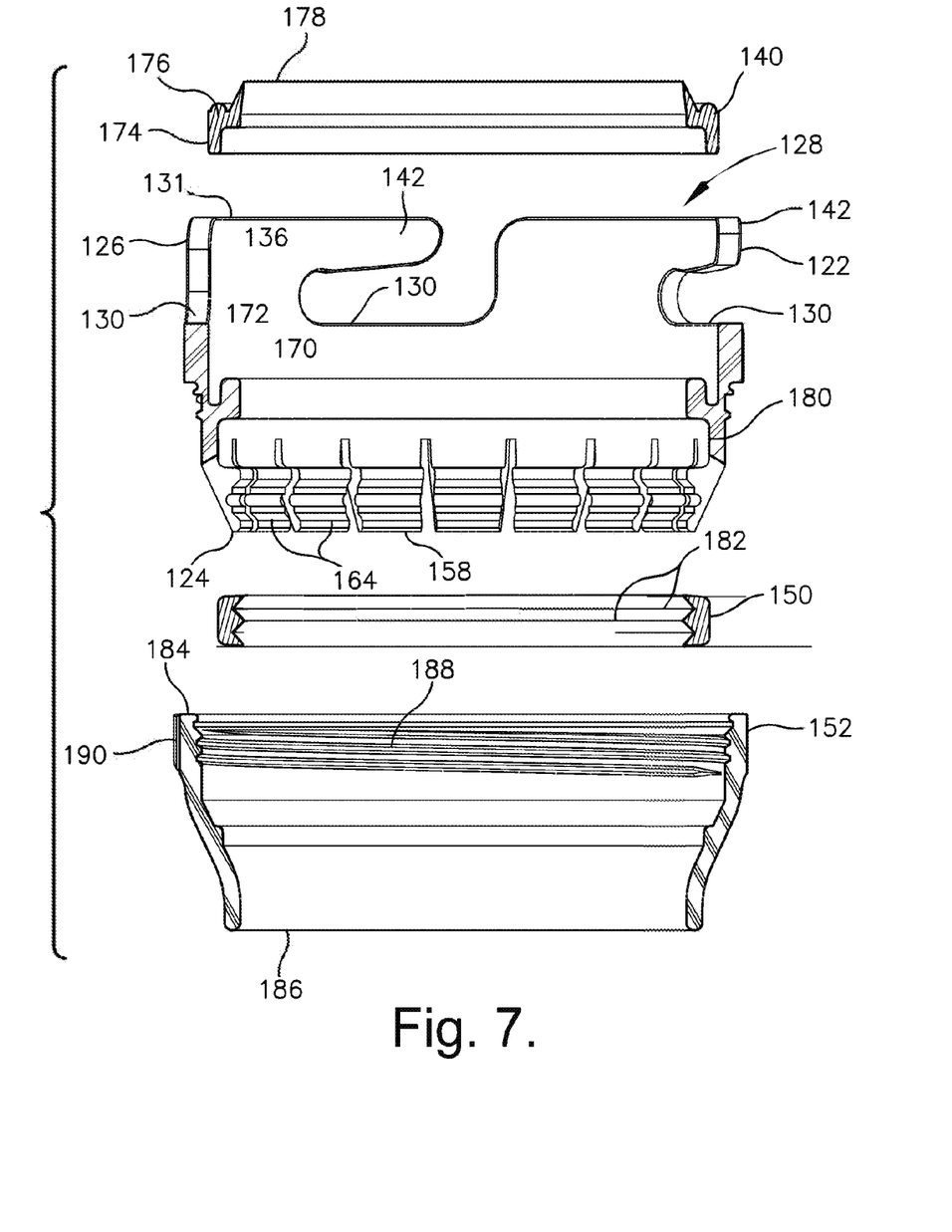
FIG. 7 is an exploded cross-sectional view of the two-part coupler of FIG. 4 taken along a bisecting longitudinal plane.

As depicted in FIG. 7, the O-ring 140 has a generally S-shaped profile with an outer leg 174, a central body 176, and an inner leg 178. The outer leg 174 is received in the groove 172 and the central body 176 seats on the shoulder 170. The inner leg 178 extends away from the central body 176 and outer leg 174 and toward the endwall 124 of the collar 122. As such, when the collar 122 is coupled to the socket 12 with a tube 18 disposed therein, the O-ring 140 is compressed between the shoulder 170, the distal end of the socket 12, and the sidewall 162 of the tube 18 to form a fluid-tight seal. The inner leg 178 may taper toward a distal edge thereof to aid receipt thereof between the socket 12 and the tube 18 being coupled via the collar 122 as described more fully below. A particular configuration of the O-ring 140 and collar 122 is shown and described herein, however it is understood that other forms and configurations thereof can be employed in embodiments of the invention without departing from the scope provided herein.

An annular recess 180 is formed in the inner surface of the collar base 156 between the shoulder 170 and the flanges 158. The annular recess 180 may partially overlap with a proximate or base portion of the flanges 158. The annular recess 180 is configured to at least partially receive the gasket 150 therein. The gasket 150 is comprised of a rubber, silicon, plastic, metal, or other material and is configured to frictionally or mechanically engage or grip the sidewall 162 of the tube 18. The gasket 150 may also provide a fluid-tight seal between the tube 18 and the collar 122. The gasket 150 includes one or more annular ribs 182, grooves, flanges, tabs, or similar features on an interior surface thereof.

Figure 6:
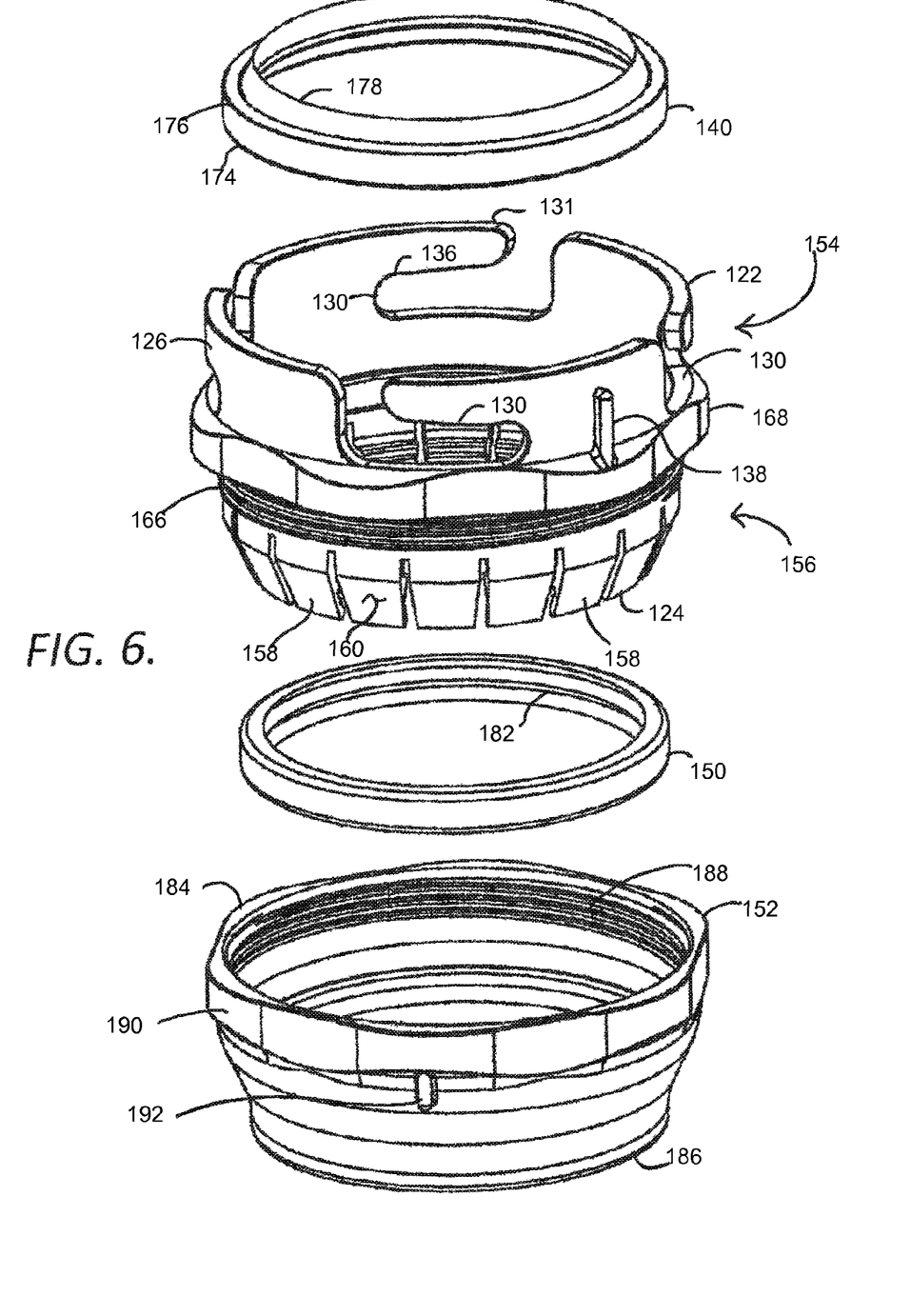
FIG. 6 is an exploded perspective view of the two-part coupler of FIG. 4.

The compression ring 152 comprises a generally cylindrical body with an interior profile that tapers from a first end 184 having dimensions suitable to receive the tube-connection portion 156 of the collar 122 therein to a second end 186 having dimensions sufficient to receive the tube 18 therein. A threaded portion 188 is provided in the interior of the first end 184 of the compression ring 152 and is configured to threadably engage the threaded section 166 of the collar 122. A gripping section 190 and/or gripping feature 192, similar to the gripping section 168 and feature 138, may be provided on the exterior of the compression ring 152 to aid a user in installing the ring 152 as described below.

With continued reference to FIGS. 4-8, installation of the two-part coupler 100 is described in accordance with an embodiment of the invention. As discussed previously above, the fitting 10 is configured to enable both known joining methods, such as chemical or physical welding, as well as mechanical joining to the tube 18. To mechanically couple the tube 18 with the fitting 10, the O-ring 140 is installed in the collar 122 by inserting the outer leg 174 thereof in the groove 172. The gasket 150 is also installed in the annular recess 180. The compression ring 152 is disposed on the tube 18 and oriented with the first end 184 thereof proximate the free end of the tube 18. The collar 122, with the O-ring 140 and gasket 150 installed therein is disposed on the tube 18 between the compression ring 152 and the free end of the tube 18 and oriented with the hub-connection portion 154 proximate the free end of the tube 18.

Figure 8:
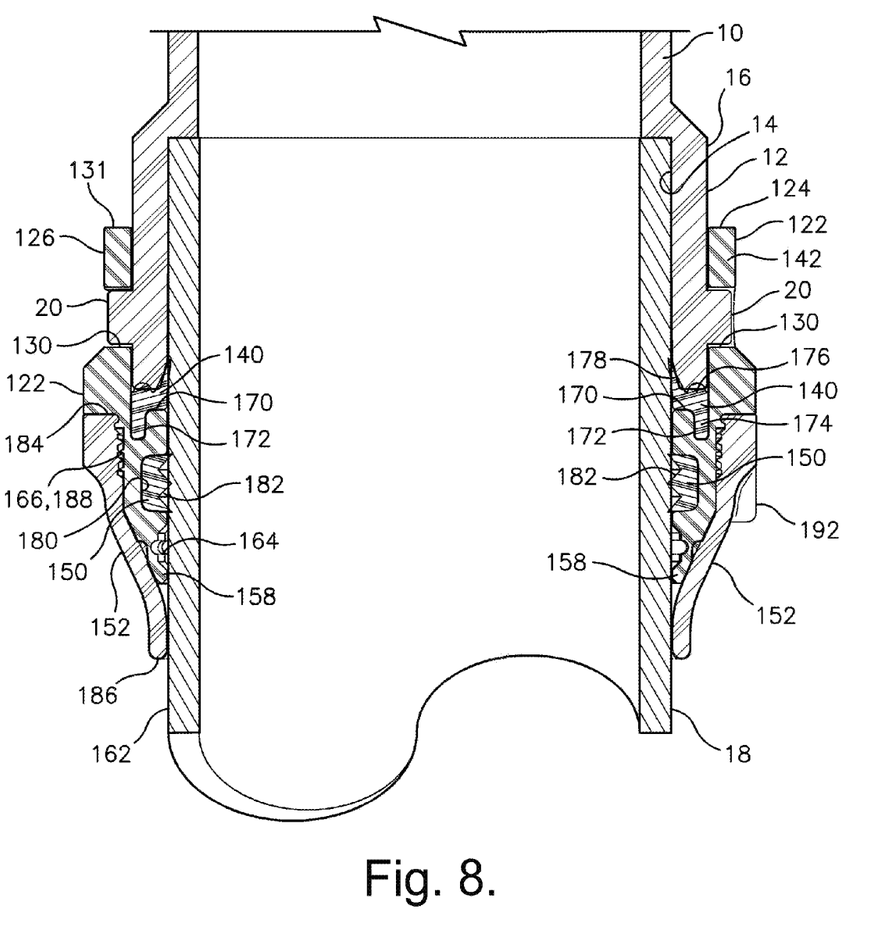
FIG. 8 is a cross-sectional view of the coupling of FIG. 4 taken along a bisecting longitudinal plane.

The tube 18 is fully inserted into the socket 12 of the fitting 10. The collar 122 is moved toward the fitting 10 to engage the projections 20 on the fitting 10 with the channels 130 in the hub-connection portion 154 of the collar 122 and then rotated in a manner similar to that described above with respect to the collar 22 to secure the projections 20 in the channels 130. Engagement of the projections 20 with the channels 130 of the collar 122 compresses the O-ring 140 between the distal end of the fitting 10, the shoulder 170 of the collar 122, and the sidewall 162 of the tube 18 to form a fluid-tight seal between the tube 18 and the fitting 10. The compression of the O-ring 140 may also frictionally engage the sidewall 162 of the tube 18 to resist or prevent withdrawal of the tube 18 from the socket 12 of the fitting 10. The gasket 150 is adapted to be compressed between the collar 122 and the tube 18 during installation of the collar 122 on the tube 18, e.g. the gasket 150 may have an interior diameter that is less than that of the exterior diameter of the tube 18. The gasket 150 can thus provide additional resistance to withdrawal of the tube 18 from the socket 12.

The threaded portion 188 of the compression ring 152 is moved into threadable engagement with the threaded section 166 of the tube-connection portion 156 of the collar 122 and rotated to draw the compression ring 152 toward the collar 122. The exterior faces 160 of the flanges 158 are contacted by the inwardly tapered interior surface of the compression ring 152. The inward taper of the compression ring 152 thereby depresses the flanges 158 radially inward toward and against the sidewall 162 of the tube 18 as the compression ring 152 is drawn toward the collar 122 and over the flanges 158. The ribs 164 on the interior surface of the flanges 158 are thus depressed against the sidewall 162 of the tube 18 to frictionally and/or mechanically engage the tube 18 and to further resist withdrawal of the tube 18 from the socket 12. Depression of the flanges 158 toward the tube 18 may also at least partially compress the gasket 150 against the sidewall 162 of the tube 18 and increase frictional engagement therebetween. In another embodiment, the gasket 150 and flanges 158 are sufficiently compressed or depressed against the sidewall 162 of the tube 18 to resist withdrawal of the tube 18 from the socket 12 without the use of the compression ring 152; the compression ring 152 may thus be omitted from the installation.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. For example, it is foreseen that the mechanical connection could be formed by threads formed on both the exterior surface 16 of socket 12 and an interior surface of the sidewall 26 of collar 22. It is also to be understood that the embodiments of the present invention could be used with both drain and supply fittings and tubing or pipe. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A fitting joinable with tubing by welding or mechanical joining, the fitting comprising:
   a socket that accepts an end of a section of tubing;
   an interior surface of the socket configured for joining to the section of tubing by welding;
   an exterior surface of the socket including a raised feature thereon; and
   a collar having a first portion that includes a sidewall configured to accept the exterior surface of the socket therein, the sidewall including a channel that receives the raised feature, the interaction of the raised feature and the channel during rotation of the collar with respect to the exterior surface draws the collar toward the socket and applies a compressive force on a sidewall of the tubing to mechanically couple the tubing in the socket, the collar also including a second portion that includes a plurality of longitudinally extending flanges, the flanges being configured to frictionally engage the sidewall of the tubing to resist withdrawal of the tubing from the socket, and wherein the second portion couples to a compression ring having a tapered interior surface, the tapered interior surface depressing the plurality of flanges toward the sidewall of the tubing.

2. The fitting of claim 1, further comprising:
   an O-ring disposed between the collar and the socket.

3. The fitting of claim 1, wherein the channel includes one or more detents that resist rotation of the collar with respect to the fitting.

4. The fitting of claim 1, wherein the channel includes a locking feature that restricts rotation of the collar with respect to the fitting.

5. The fitting of claim 1, further comprising:
   a hand tool that is configured to aid rotation of the collar.

6. The fitting of claim 1, wherein the end of the section of tubing is welded to the interior of the socket by solvent welding.

7. The fitting of claim 1, wherein the end of the section of tubing is both welded and mechanically joined to the fitting.

8. The fitting of claim 1, wherein the channel is a bayonet-style channel.

9. The fitting of claim 8, wherein the channel extends around no more than approximately one quarter of the circumference of the sidewall of the collar.

10. The fitting of claim 8, wherein the channel extends around no more than approximately one eighth of the circumference of the sidewall of the collar.

11. The fitting of claim 8, wherein the channel extends around no more than approximately one half of the circumference of the sidewall of the collar.

12. A fitting joinable with tubing by welding or mechanical joining, the fitting comprising:
    a socket that accepts an end of a section of tubing, the section of tubing being formed from a first weldable plastic, the socket being formed from a second weldable plastic, and the first and second weldable plastics being the same or different;
    a first surface of the socket configured for joining to the section of tubing by welding;
    a second surface of the socket including a raised feature thereon; and
    a coupler having a receiver that receives the raised feature to connect the coupler to the second surface of the socket, engagement of the raised feature with the receiver applying a compressive force on a sidewall of the section of tubing to mechanically couple the tubing in the socket, the coupler further including a plurality of longitudinally extending flanges and a compression ring coupled to the coupler and depressing the plurality of flanges against the sidewall of the section of tubing.

13. A coupler for mechanically joining a section of tubing in a socket, the coupler comprising:
    an endwall with a central bore therethrough, the central bore being sized to accept a section of tubing;
    an annular sidewall extending from the endwall and about the central bore;
    a receiver disposed in the annular sidewall and configured to receive a raised feature on a socket into which an end of the section of tubing is inserted, the socket and the section of tubing comprising one or more weldable plastics;
    a sealing member disposed interior to the annular sidewall, receipt of the raised feature by the receiver applying a compressive force on the sealing member to compress the sealing member between the socket and the section of tubing to mechanically join the section of tubing with the socket;
    a plurality of longitudinally extending flanges extending from the annular sidewall opposite the endwall; and
    a compression ring coupled to the annular sidewall and depressing the plurality of flanges against the tubing to mechanically join the section of tubing with the socket.

14. A fitting joinable with tubing by welding or mechanical joining, the fitting comprising:
   a socket that accepts an end of a section of tubing, the section of tubing and the socket being formed from one or more weldable plastics;
   a first surface of the socket configured to join with the section of tubing by welding; and
   a second surface of the socket including a first feature that is useable to connect to a coupler, the coupler including a second feature that is engageable with the first feature to connect the coupler to the second surface of the socket and to maintain a compressive force on a sidewall of the section of tubing for mechanically joining the section of tubing with the socket, the coupler further including a plurality of longitudinally extending flanges and a compression ring coupled to the annular sidewall and depressing the plurality of flanges against the sidewall of the section of tubing to mechanically join the section of tubing with the socket.

15. A fitting joinable with tubing by welding or mechanical joining, the fitting comprising:
   a socket that accepts an end of a section of tubing, the socket and the section of tubing being formed from one or more weldable plastics;
   an interior surface of the socket configured for joining to the section of tubing by welding;
   an exterior surface of the socket including a first feature thereon, the first feature including a raised feature or a receiver that receives the raised feature; and
   a coupler having a sidewall configured to accept the exterior surface of the socket therein, the sidewall including a second feature, the second feature being different from the first feature and including the raised feature or the receiver that receives the raised feature, the engagement of the raised feature and the receiver during installation of the coupler on the socket maintains a compressive force on a sidewall of the tubing to mechanically couple the tubing in the socket, the coupler further including a plurality of longitudinally extending flanges extending from the sidewall and a compression ring coupled to the sidewall and depressing the plurality of flanges against the tubing.

16. A fitting joinable with tubing by welding or mechanical joining, the fitting comprising:
   a socket that accepts an end of a section of tubing;
   an interior surface of the socket configured for joining to the section of tubing by welding;
   an exterior surface of the socket including a raised feature thereon;
   a collar having a first portion including a sidewall configured to accept the exterior surface of the socket therein and a sealing ring disposed interior to the collar; the sidewall including a channel that receives the raised feature, the interaction of the raised feature and the channel during rotation of the collar with respect to the exterior surface draws the collar toward the socket and applies a compressive force that compresses the sealing ring against the sidewall of the tubing to form a fluid-tight seal between the socket and the tubing;
   a second portion of the collar, the second portion including a plurality of longitudinally extending flanges, the flanges being configured to frictionally engage the sidewall of the tubing to resist withdrawal of the tubing from the socket; and
   a compression ring having a tapered interior surface, the compression ring coupling to the second portion and the tapered interior surface depressing the plurality of flanges toward the sidewall of the tubing.

17. The fitting of claim 16, wherein the second portion of the collar and the compression ring include mating threaded portions, and wherein the compression ring is threadably coupled to the second portion of the collar.

18. The fitting of claim 16, further comprising:
   a gasket disposed on an interior surface of the second portion of the collar, the gasket frictionally engaging the sidewall of the tubing.

19. The fitting of claim 18, wherein the gasket includes a transverse rib.

20. A fitting joinable with tubing by welding or mechanical joining, the fitting comprising:
   a socket that accepts an end of a section of tubing, the section of tubing and the socket being formed from one or more weldable plastics;
   a first surface of the socket configured to join with the section of tubing by welding; and
   a second surface of the socket including a first feature that is useable to connect to a coupler, the coupler including a second feature that is engageable with the first feature to connect the coupler to the second surface of the socket and to maintain a compressive force on a sidewall of the section of tubing to provide a fluid-tight seal between the socket and the tubing, the coupler further including a plurality of longitudinally extending flanges that frictionally engage the sidewall of the tubing and a compression ring having a tapered interior surface, the compression ring coupling to the coupler and depressing the plurality of flanges toward the sidewall of the section of tubing to mechanically join the section of tubing with the socket.

21. A fitting joinable with tubing by welding or mechanical joining, the fitting comprising:
   a socket that accepts an end of a section of tubing;
   an interior surface of the socket configured for joining to the section of tubing by welding;
   an exterior surface of the socket having a raised feature associated therewith; and
   a collar having a sidewall configured to accept the exterior surface of the socket therein, the sidewall including at least one channel that receives the raised feature, the interaction of the raised feature and the channel during rotation of the collar with respect to the exterior surface draws the collar toward the socket and applies a compressive force on a sidewall of the tubing to mechanically couple the tubing and the socket, the coupler further including a plurality of longitudinally extending flanges extending from the sidewall and a compression ring coupled to the sidewall and depressing the plurality of flanges against the sidewall of the tubing.

* * * * *